US012340365B2

(12) United States Patent
Mallela et al.

(10) Patent No.: US 12,340,365 B2
(45) Date of Patent: Jun. 24, 2025

(54) DISTRIBUTED LEDGER BASED MULTI-CURRENCY CLEARING AND SETTLEMENT

(71) Applicant: PARTIOR PTE. LTD, Singapore (SG)

(72) Inventors: Naveen Mallela, Singapore (SG); Srimukh Oddiraju, New York, NY (US); Mark J. Attard, Singapore (SG); Atul Bhuchar, Singapore (SG); Keith Desouza, Singapore (SG); Zhenqian Tay, Singapore (SG); Muh Hwa Lee, Singapore (SG); Peng Khim Ng, Singapore (SG); Chang Ching Loh, Singapore (SG)

(73) Assignee: PARTIOR PTE. LTD, Singapore (SG)

( * ) Notice: Subject to any disclaimer, the term of this patent is extended or adjusted under 35 U.S.C. 154(b) by 100 days.

(21) Appl. No.: 17/644,892

(22) Filed: Dec. 17, 2021

(65) Prior Publication Data
US 2022/0374880 A1 Nov. 24, 2022

Related U.S. Application Data

(60) Provisional application No. 63/190,313, filed on May 19, 2021.

(51) Int. Cl.
*G06Q 20/38* (2012.01)
*G06Q 20/10* (2012.01)
(52) U.S. Cl.
CPC ......... *G06Q 20/389* (2013.01); *G06Q 20/108* (2013.01); *G06Q 20/3827* (2013.01); *G06Q 20/3829* (2013.01)
(58) Field of Classification Search
CPC .................................................. G06Q 20/3823
See application file for complete search history.

(56) References Cited

U.S. PATENT DOCUMENTS 10,121,025 B1 * 11/2018 Rice .................. H04L 9/3239
11,017,381 B1 5/2021 Winklevoss et al.
(Continued)

OTHER PUBLICATIONS

Wikipedia, "Public-key cryptography". Retrieved from Wayback Machine archived on May 17, 2021. https://web.archive.org/web/20210517004446/https://en.wikipedia.org/wiki/Public-key_cryptography (Year: 2021).*

(Continued)

*Primary Examiner* — Jamie R Kucab
*Assistant Examiner* — Scott Michael Diroma
(74) *Attorney, Agent, or Firm* — GREENBERG TRAURIG LLP

(57) ABSTRACT

A distributed ledger system may include a first distributed ledger node associated with a first participant bank that maintains a first participant bank deposit account on a blockchain-based distributed ledger in a distributed ledger network; a second distributed ledger node associated with a second participant bank that maintains a second participant bank deposit account on the blockchain-based distributed ledger; and a third distributed ledger node associated with a liquidity provider that maintains a liquidity provider deposit account on the blockchain-based distributed ledger. A consensus algorithm operates on the distributed ledger nodes and updates the blockchain-based distributed ledger in which multiple copies of the blockchain-based distributed ledger across the distributed ledger nodes, and transactions involving the first participant bank deposit account, the second participant bank deposit account, and/or the liquidity provider deposit account are added to a block to the blockchain-based distributed ledger.

10 Claims, 10 Drawing Sheets

(56) References Cited

U.S. PATENT DOCUMENTS

| | | | | |
|---|---|---|---|---|
| 11,093,933 B1* | 8/2021 | Peng | ................... | H04L 9/3239 |
| 2017/0353309 A1* | 12/2017 | Gray | ..................... | G06F 21/51 |
| 2018/0121911 A1* | 5/2018 | Hallam | ................ | G06Q 20/10 |
| 2019/0013934 A1* | 1/2019 | Mercuri | ............... | G06F 21/602 |
| 2019/0050855 A1* | 2/2019 | Martino | ............... | G06F 16/182 |
| 2019/0385172 A1 | 12/2019 | Jayaram et al. | | |
| 2020/0092106 A1* | 3/2020 | Leong | .................. | H04L 9/3268 |
| 2021/0174320 A1 | 6/2021 | Carlyle et al. | | |
| 2022/0067718 A1* | 3/2022 | Bellamy | ................ | G06F 16/27 |

OTHER PUBLICATIONS

Wikipedia "Checksum", as revised on Apr. 26, 2021, retrieved from https://en.wikipedia.org/w/index.php?title=Checksum&oldid=1019951862. (Year: 2021).*

International Search Report and Written Opinion of the International Searching Authority, dated Jun. 6, 2023, from corresponding International Application No. PCT/SG2022/050914.

* cited by examiner

DISTRIBUTED LEDGER BASED MULTI-CURRENCY CLEARING AND SETTLEMENT

RELATED APPLICATIONS

This application claims priority to, and the benefit of, U.S. Provisional Patent Application Ser. No. 63/190,313, filed May 19, 2021, the disclosure of which is hereby incorporated, by reference, in its entirety.

BACKGROUND OF THE INVENTION

1. Field of the Invention

Embodiments are directed to distributed ledger based multi-currency clearing and settlement across multiple and distinct entities.

2. Description of the Related Art

Typically, bank-based blockchain payment networks use one level of liabilities or they propose the use of object money. Thus, liability resides with a single entity (e.g., a commercial bank, a central bank, or a single trust/custodian). The model of using one level of liabilities makes it difficult to scale, particularly if every participant requires a direct relationship with the single entity. Such models are challenging to scale due to risk or business reasons.

SUMMARY OF THE INVENTION

Distributed ledger based multi-currency clearing and settlement across multiple and distinct entities are disclosed. In one embodiment, a distributed ledger system may include a first distributed ledger node associated with a first participant bank, wherein the first participant bank maintains a first participant bank deposit account on a blockchain-based distributed ledger in a distributed ledger network; a second distributed ledger node associated with a second participant bank, wherein the second participant bank maintains a second participant bank deposit account on the blockchain-based distributed ledger in the distributed ledger network; and a third distributed ledger node associated with a liquidity provider, wherein the liquidity provider maintains a liquidity provider deposit account on the blockchain-based distributed ledger in the distributed ledger network. A consensus algorithm operates on the distributed ledger nodes and updates the blockchain-based distributed ledger in which multiple copies of the blockchain-based distributed ledger that exist across the distributed ledger nodes, and transactions involving the first participant bank deposit account, the second participant bank deposit account, and/or the liquidity provider deposit account are added to a block to the blockchain-based distributed ledger.

In one embodiment, the transaction may include a deposit transaction.

In one embodiment, the transaction may include a withdrawal transaction.

In one embodiment, the transaction may include a transfer transaction.

In one embodiment, balance and transaction information for the first participant bank deposit account, the second participant bank deposit account, and the liquidity provider deposit account may be private to the first participant bank, the second participant bank, and the liquidity provider, respectively.

In one embodiment, a transaction payload for a transaction between the first participant bank and the second participant bank may be private to the first participant bank and the second participant bank.

In one embodiment, the transaction payload for the transaction between the first participant bank and the second participant bank may be written to a private state for the first participant bank and the second participant bank, and a hash of the transaction payload may be written to the distributed ledger.

According to another embodiment, a method for distributed ledger based multi-currency clearing and settlement may include: receiving, at a first distributed ledger node for a first financial institution, a transfer request from a payor to transfer funds to a payee, the payee associated with a second financial institution; generating, by the first distributed ledger node, a symmetric key; encrypting, by the first distributed ledger node, a transaction payload for the transaction with the symmetric key; retrieving, by the first distributed ledger node, a public key for the second financial institution; generating, by the first distributed ledger node, a first financial institution/second financial institution shared key using a private key for the first financial institution and the public key for the second financial institution; encrypting, by the first distributed ledger node, the symmetric key with the first financial institution/second financial institution shared key; sending, by the first distributed ledger node, the encrypted transaction payload and the encrypted symmetric key to a second distributed ledger node for the second financial institution, wherein the second distributed ledger node generates the first financial institution/second financial institution shared key using a public key for the first financial institution and a private key for the second financial institution, decrypts the symmetric key using the first financial institution/second financial institution shared key, decrypts the transaction payload using the symmetric key, and writes the transaction payload to a second financial institution private state; retrieving, by the first distributed ledger node, a public key for a liquidity provider; generating, by the first distributed ledger node, a first financial institution/liquidity provider shared key using a private key for the first financial institution and the public key for the liquidity provider; encrypting, by the first distributed ledger node, the symmetric key with the first financial institution/ liquidity provider shared key; sending, by the first distributed ledger node, the encrypted transaction payload and the encrypted symmetric key to a liquidity provider distributed ledger node for the liquidity provider, wherein the liquidity provider distributed ledger node generates the financial institution/liquidity provider shared key using a public key for the first financial institution and a private key for the liquidity provider, decrypts the symmetric key using the financial institution/liquidity provider shared key, decrypts the transaction payload using the symmetric key, and writes the transaction payload to a liquidity provider private state; generating, by the first distributed ledger node, a hash of the encrypted transaction payload; and submitting, by the first distributed ledger node, the hash of the encrypted transaction payload to the distributed ledger; wherein a smart contract on the first distributed ledger node verifies that an account for the first financial institution has sufficient funds for the transaction and atomically transfers the funds from the account for the first financial institution on the distributed ledger to an account for the second financial institution on the distributed ledger.

In one embodiment, the smart contract may further recompute balance ladders for the account for the first financial institution and the account for the second financial institution.

In one embodiment, the hash of the encrypted transaction payload may be generated after the first financial institution distributed ledger node and the liquidity provider distributed ledger node have decrypted the transaction payload and written it to their respective private states.

In one embodiment, the smart contract may further verify that the account for the first financial institution or the account for the second financial institution are not closed or frozen.

In one embodiment the result of the verification may be replicated to smart contracts executed on the second distributed ledger node and the liquidity provider distributed ledger node.

In one embodiment, wherein the transfer of funds from the account for the first financial institution to the account for the second financial institution may be based on a separate agreement between the payor and the payee.

According to another embodiment, a method for private state resynchronization in a distributed ledger network may include: generating, by a smart contract executed on a liquidity provider distributed ledger node for a liquidity provider, a hash of each of a plurality of accounting entries involving a first financial institution at the liquidity provider distributed ledger node; sending, by the smart contract, the hashes to a first financial institution distributed ledger node, wherein the first financial institution distributed ledger node generates hashes of each of a plurality of accounting entries in a private state for the first financial institution distributed ledger node and compares the hashes from the liquidity provider distributed ledger node to the hashes generated by the first financial institution distributed ledger node; and resyncing, by the smart contract, one or more of the plurality of accounting entries at the liquidity provider distributed ledger node with the one or more of the plurality of accounting entries at the first financial institution ledger node.

In one embodiment, wherein the one or more of the plurality of accounting entries that are resynched may be identified as having hashes from the liquidity provider distributed ledger node that do not match hashes generated by the first financial institution distributed ledger node.

In one embodiment, wherein the smart contract executed on the liquidity provider distributed ledger node may generate the hashes periodically.

In one embodiment, wherein the smart contract executed on the liquidity provider distributed ledger node may generate the hashes in response to a private state divergence at the first financial institution distributed ledger node.

According to another embodiment, a method for distributed ledger based multi-tiered liability may include receiving, by a payer participant bank distributed ledger node, an instruction to transfer an amount into an on-chain payer account on a distributed ledger in a distributed ledger network; debiting, by the payer participant bank distributed ledger node, an off-chain payer account for the amount and crediting the payer on-chain account with the amount; receiving, from the payer and by the payer participant bank, an instruction to make a payment debiting the payer on-chain account and crediting a payee on-chain account, wherein the payee on-chain account belongs to another participant bank in the distributed ledger network; requesting, by the payer participant bank distributed ledger node and to a liquidity provider distributed ledger node, a deposit of funds into a payer participant bank's on-chain account, wherein the liquidity provider distributed ledger node debits a payer participant bank off-chain account and credits the payer participant bank on-chain account; and invoking, by the payer participant bank distributed ledger node, a first smart contract on the distributed ledger to initiate the payment transfer to the payee on-chain account, wherein the first smart contract notifies the liquidity provider distributed ledger node to effect settlement for the payment, and the liquidity provider distributed ledger node invokes a second smart contract to debit the payer participant bank on-chain account, and credit the payer participant bank on-chain account, and informs the payee participant bank distributed ledger node and the payee participant bank distributed ledger node that settlement is complete, and the payee participant bank distributed ledger node invokes a third smart contract to debit the payee participant bank on-chain account and credit the payee on-chain deposit account.

In one embodiment, the payer participant bank distributed ledger node may debit the off-chain payer account for the amount and credits the payer on-chain account with the amount using a pair of bridging accounts.

In one embodiment, the payee participant bank may be configured to debit the payee's on-chain deposit account, and to transfer the funds to an off-chain deposit account.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1:
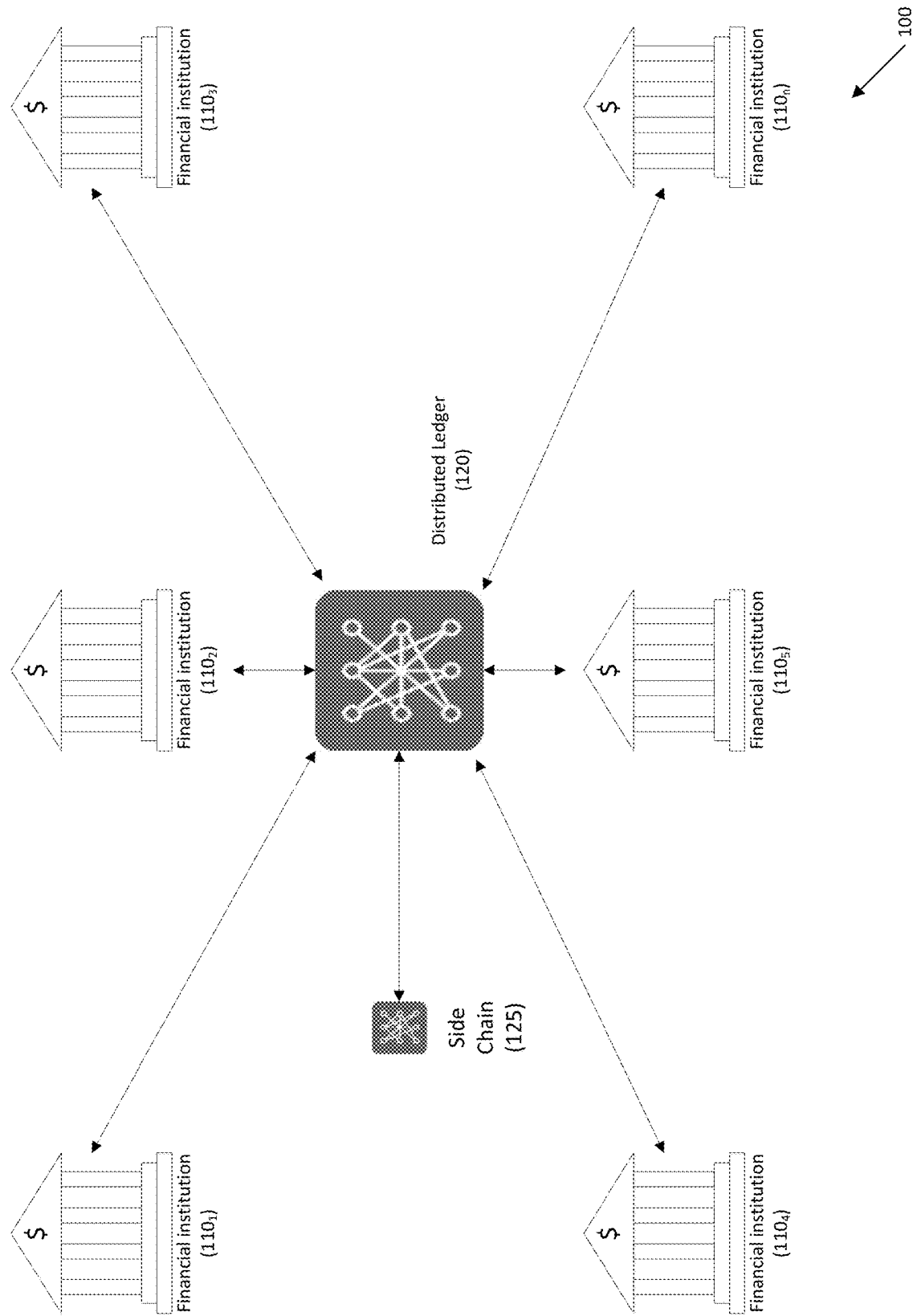
FIG. 1 depicts a system for distributed ledger based multi-currency clearing and settlement across multiple and distinct entities according to an embodiment.

The disclosures of each of U.S. Provisional Patent Application Ser. No. 63/071,721 and U.S. Provisional Patent Application Ser. No. 63/071,727 is each hereby incorporated, by reference, in its entirety.

Embodiments are directed to distributed ledger based multi-currency clearing and settlement across multiple and distinct entities. Embodiments facilitate multiple financial institutions to use a shared distributed ledger as their respective ledger of nostro accounts, deposit accounts, etc. Thus, settlement between accounts may simplified.

In one embodiment, the distributed ledger may be a permissioned distributed ledger, and For example, embodiments facilitate the settlement of liabilities across multiple parties by using a tiered construct. Benefits include the ability for each bank to work within their existing risk and capital framework. The network, however, may facilitate transfers at any time of day (e.g., 24 hours a day, 7 days a week) due to the distributed hosting that is independent to any single bank's infrastructure. Thus, banks may transfer deposit liabilities without the limitations of their branch banking hours or on any other bank's operating hours.

Embodiments may provide some or all of the following benefits: (1) the ability to deposit, transfer, and withdraw tiered liabilities instantly with visibility across each tier to the liquidity provider; (2) the ability to ensure lower tier liabilities are backed 1:1 with deposits at the higher tier so there is no new money multiplier effect; (3) the ability to program the deposits at each tier with business rules and logic for conditional payments; (4) the ability to have market makers facilitate cross-currency transactions in a payment versus payment method (e.g., deposits for both legs of the transaction settle simultaneously, or not at all); (5) the ability to allow corporate customers to hold deposit accounts and make payments to each other through a bank agnostic interface without instructing a bank directly. Banks are ultimately still able to be responsible for the liabilities, but can have other user experience or service providers come in to facilitate the transfers. Embodiment may provide some or all of these capabilities while retaining maintaining existing bank processes around accounting, liquidity provisioning, screening, checks, etc.

As used herein, the phrase "Issuing Bank" or "Liquidity Provider" refers to the bank of record for the deposit accounts (e.g., demand deposit accounts (DDAs), CASA accounts, etc.) of direct participant banks recorded on the blockchain ledger (i.e., the deposit liability evidenced by such account is enforceable as a liability of the Issuing Bank and represents deposit assets of the direct participant bank) and offers settlement and clearing services in respect of such accounts. A "direct participant bank" refers to a bank holding a deposit account with an issuing bank that is recorded on the blockchain ledger. In some figures, an issuing bank of United States dollars (USD) provides clearing and settlement services using distributed ledger technology.

In embodiments, a payment versus payment, or PvP process may be provided. For PvP, the foreign exchange (FX) rate may not be explicitly provided by the transacting counterparty financial institutions. Each financial institution may provide the amount and currency that they are paying, and also the equivalent amount and currency that they expect to receive. From this information, an implied FX rate may be calculated. The parties, however, may agree to the amount being exchanged rather than the FX rate. Thus, while PvP may also be used for escrow-type arrangements that are not a direct result of a FX trade.

In addition to the amount and currency to be exchanged, counterparties may provide the value date and also the transaction reference, such as a reference to a trade booking.

As long as the value date and transaction reference provided by both counterparties match, the PvP exchange may be executed. The matching is evidence of a prior agreement between both counterparties.

Referring to FIG. 1, an architectural diagram of a system for distributed ledger based multi-currency clearing and settlement according to an embodiment. System 100 may include a plurality of financial institutions 110 (e.g., $110_1$, $110_2$, . . . $110_n$). Financial institutions may include issuing banks, liquidity providers, direct participating banks, etc. For example, participant banks are financial institutions that has corporates as clients, and liquidity providers are financial institutions that have participant banks as clients.

Financial institutions 110 may interface with distributed ledger 120 as nodes, and may maintain nostro or deposit accounts on distributed ledger 120. In one embodiment, the accounts on distributed ledger 120 may in any currency, including fiat currencies, stablecoins, etc.

Financial institutions 110 may each have a plurality of clients (not shown), such as corporate clients and other financial institutions, and financial institutions 110 may maintain the accounts on distributed ledger 120 on behalf of their clients.

In one embodiment, distributed ledger 120 may be a permissioned distributed ledger, accessible only to participating financial institutions 110. In one embodiment, the data in accounts on distributed ledger 120 may be private to financial institutions 110 that maintain the accounts, are involved in the transactions, etc. For example, data may be encrypted with the private key for the host financial institution 110.

In one embodiment, distributed ledger 120 may be a blockchain-based distributed ledger system. A consensus algorithm may operate on a plurality of distributed computer nodes, such as a node for each participating financial institution 110. Multiple copies of distributed ledger 120 may exist across the plurality of distributed computer nodes. A consensus algorithm may operate on each of the distributed computer nodes, and may update distributed ledger 120 by adding blocks to the blockchain-based system.

In one embodiment, each node may store a public state and a private state for each financial institution 110.

Examples of distributed ledgers including such states are disclosed in U.S. Patent Application Ser. No. 62/316,841 and of U.S. Pat. No. 10,749,848, the disclosures of which are hereby incorporated, by reference, in their entireties.

In one embodiment, smart contracts may be deployed to distributed ledger 120. The smart contracts may perform various functions, including database functions.

In one embodiment, additional distributed ledgers 125 (e.g., "side chains") may be provided as is necessary and/or desired. For example, the side chains may provide information about foreign exchange rate agreements, contracts, etc.

Embodiments allow network participants, such as financial institutions 110, their clients, etc., to offer services, such as foreign exchange trades, offering optimization for intercompany transfers and foreign exchange savings, etc. System 100 provides an ecosystem in which network participants may deploy smart contracts that overlay on top of the foundational capabilities of deposit account transfers.

In embodiments, smart contract oracles may be deployed on distributed ledger 120 and may provide market data feeds (e.g., foreign exchange rate feeds, stock price feeds, etc.), may publish transaction fees levied by financial institutions 110 as a pricing discovery mechanism. Financial institutions 110 may manage their own private keys in their own key management systems (KMS) (not shown), and their corresponding public keys may be stored on the distributed ledger 120 in a smart contract registry of participants, where only registered keys are permitted to transact.

In embodiments, each account on distributed ledger 120 may have different dates, including a settlement date, which is the date when an entry is posted into the ledger (i.e., when settlement happens), a book date, which is the business date to be used for booking into the financial institution's general ledger system, a value date, which is use for interest accrual purposes, and an exposure date, which is used for projecting credit risk. The settlement date and the book date may differ when settlement happens on weekends and non-business days, because general ledgers usually do not operate on non-business days.

A combination of these dates may be used to create and maintain the respective balance ladders on the distributed ledger. For example, (1) value dated balance ladder—day-wise balance used for recognizing interest accruals; (2) available balance ladder—day-wise projected availability of funds for account holders to use/withdraw; and (3) cleared funds balance ladder—day-wise projected availability of funds for account holders to use/withdraw recognizing projected future debits as not available for use today. Such capabilities provide support for interest-bearing accounts and overdraft/credit facilities.

Figure 2:
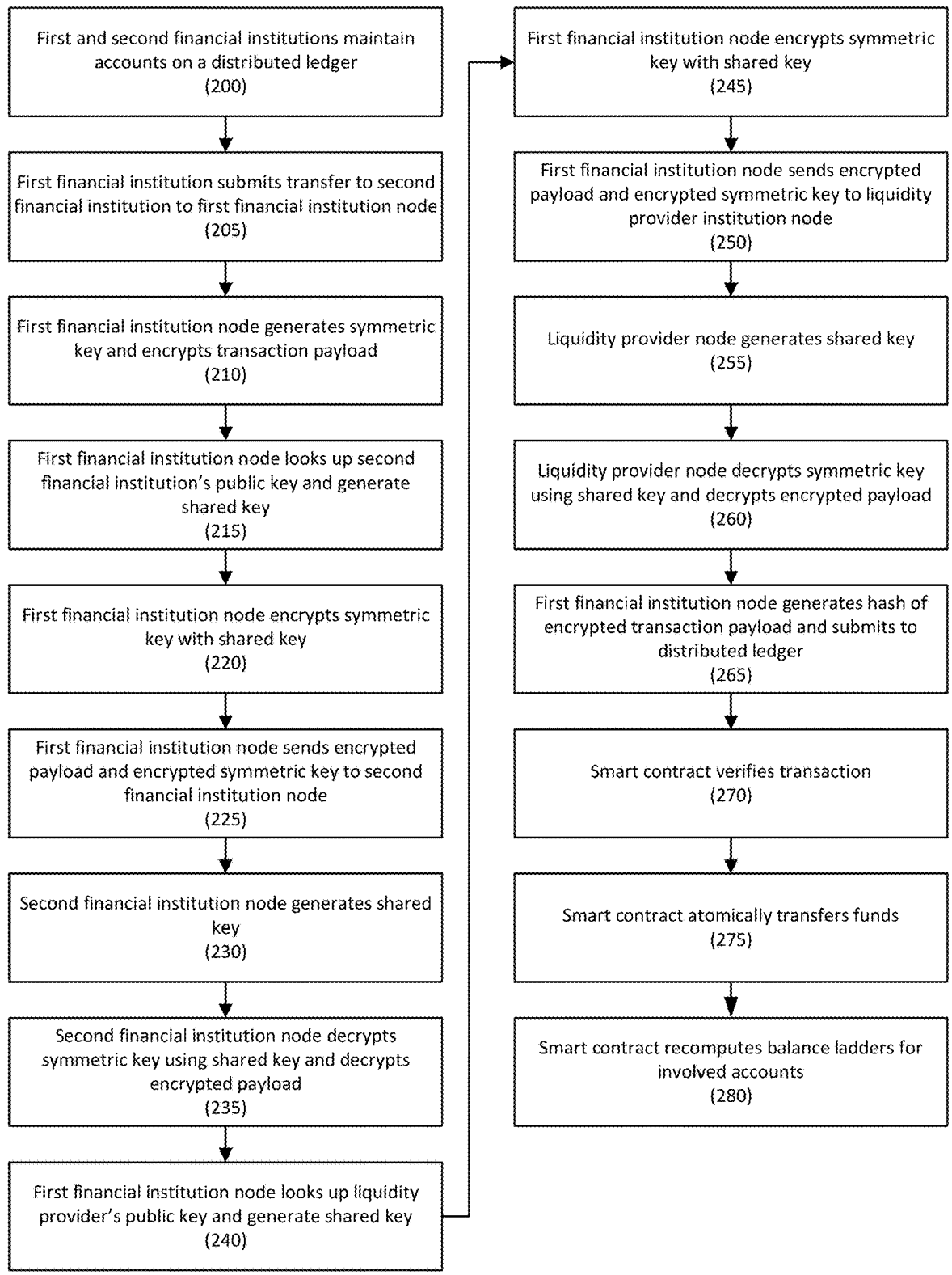
FIG. 2 depicts a method for distributed ledger based multi-currency clearing and settlement.

Referring to FIG. 2, a method for distributed ledger based multi-currency clearing and settlement is disclosed according to an embodiment.

In step 200, financial institutions may maintain accounts, such as nostro accounts, deposit accounts, for their clients on a distributed ledger. In one embodiment, the distributed ledger may be a permissioned distributed ledger and the transactions may be private to entities that are not parties to transactions.

In step 205, a first financial institution may submit a transfer request to its distributed ledger node. The transfer request may be to transfer funds to a second financial institution.

In step 210, the first financial institution's distributed ledger node may generate a symmetric key and may encrypt the transaction payload using the symmetric key.

In step 215, the first financial institution may look up the second financial institution's public key, and may generate a first financial institution/second financial institution shared key using the first financial institution's private key and the second financial institution's public key.

In step 220, the first financial institution's distributed ledger node may encrypt the symmetric key with the first financial institution/second financial institution shared key.

In step 225, the first financial institution's distributed ledger node may send the encrypted transaction payload and the encrypted symmetric key to the second financial institution's distributed ledger node.

In step 230, the second financial institution's distributed ledger node may generate the first financial institution/second financial institution shared key using the first financial institution's public key and the second financial institution's private key.

In step 235, the second financial institution's distributed ledger node may decrypt the symmetric key using the first financial institution/second financial institution shared key, and may use the symmetric key to decrypt the transaction payload. The second financial institution's distributed ledger node may write the decrypted transaction payload to its private state.

In step 240, the first financial institution may look up the liquidity provider's public key, and may generate a first financial institution/liquidity provider shared key for use with the liquidity provider financial institution using the first financial institution's private key and the liquidity provider's public key.

In step 245, the first financial institution's distributed ledger node may encrypt the symmetric key with the first financial institution/liquidity provider shared key.

In step 250, the first financial institution's distributed ledger node may send the encrypted transaction payload and the encrypted symmetric key to the liquidity provider's distributed ledger node.

In step 255, the liquidity provider's distributed ledger node may generate the first financial institution/liquidity provider shared key using the first financial institution's public key and the liquidity provider's private key.

In step 260, the liquidity provider's distributed ledger node may decrypt the symmetric key using the first financial institution/liquidity provider shared key, and may use the symmetric key to decrypt the transaction payload. The liquidity provider's distributed ledger node may write the decrypted transaction payload to its private state.

In step 265, the first financial institution's distributed ledger node may generate a hash of the encrypted transaction payload, and may submit the hash to the distributed ledger. In embodiments, the hash may be submitted to the distributed ledger only if the encrypted payload is sent to both the second financial institution and the liquidity provider, and after both decrypt the transaction payload.

In step 270, a smart contract may verify that the first financial institution's account has sufficient funds for the transaction, whether the crediting account number exists, that the account is not closed or frozen, etc. For example, because the first financial institution is triggering the transactions from the first financial institution's distributed ledger node, the smart contract on the financial institution's distributed ledger node performs this verification. The result of the verification, i.e. whether the validation is successful and if not the failure code, is then replicated to other smart contracts on the other distributed ledger nodes that are parties to the transaction.

In step 275, the smart contract may atomically transfer the funds from the first financial institution's account to the second financial institution's account. In one embodiment, if any foreign exchange is needed, the smart contract may retrieve an agreement between the parties specifying the foreign exchange rate, may receiving a foreign exchange rate from an external source, etc.

In step 280, the smart contract may recompute the balance ladders for the accounts due to the fund movement.

Because embodiments implement privacy restrictions, not all of the distributed ledger node in the distributed ledger network have the same copy of the distributed ledger, which leads to "private state divergence," meaning that the distributed ledger nodes are generally not in sync. This prevents use of a consensus mechanism, which requires a different approach to detecting data loss in transit.

For example, because nostro accounts are held in the books of the liquidity provider, the private data within the distributed ledger node of the liquidity provider is always the "golden source." Thus, in embodiments, all accounting entries posted to nostro accounts of the liquidity provider always originate on the liquidity provider's distributed ledger node, and then may be delivered to the financial institutions that are parties to the transaction. When data is lost due to network failure, it potentially results in the financial institutions that are parties to the transactions not receiving those updates, and hence the accounting entries in the those financial institutions' distributed ledger nodes will "diverge" from the records of the liquidity provider.

Figure 3:
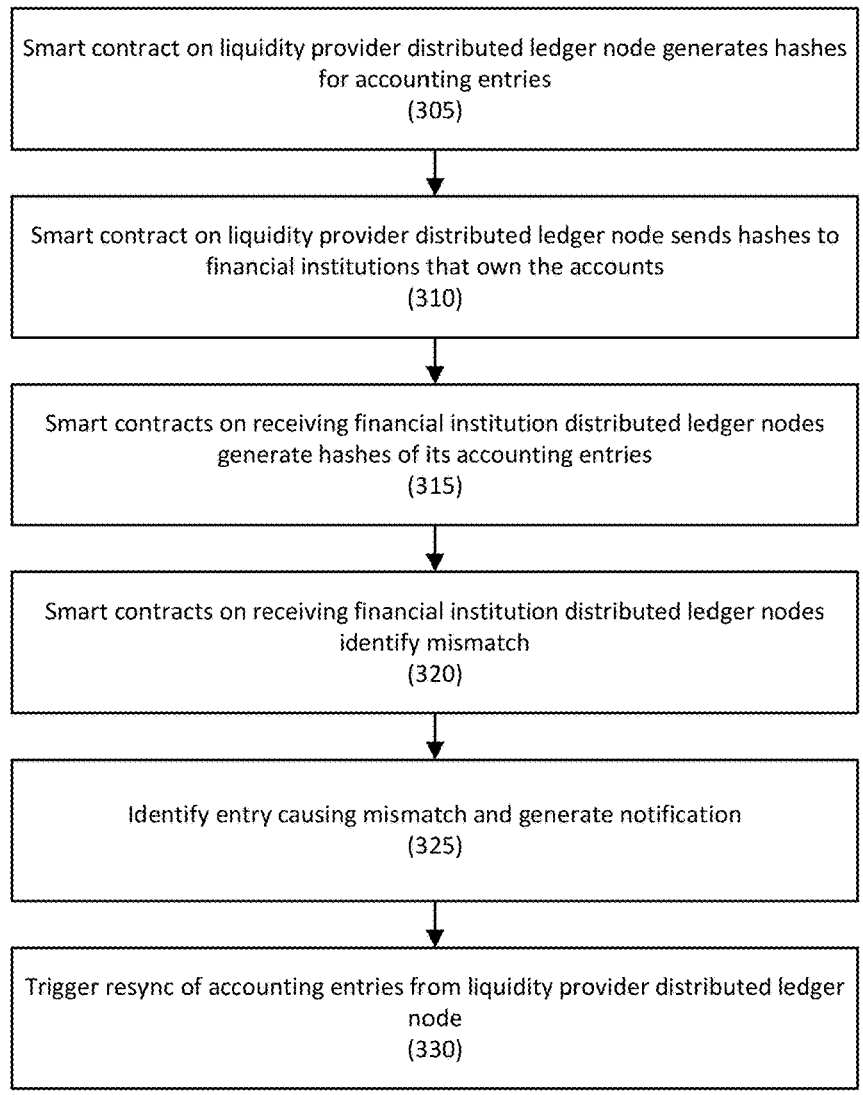
FIG. 3 depicts a method for private state resynchronization in a distributed ledger network according to one embodiment.

Thus, referring to FIG. 3, in step 305, at certain time intervals, on demand, etc., a smart contract running on the liquidity provider distributed ledger node may generate a hash of the accounting entries generated during the time window for a particular account, and, in step 310, may send the hashes to the respective financial institutions that own the accounts.

In step 315, smart contracts on the receiving financial institutions' distributed ledger nodes may also generate hashes of the accounting entries based on its own private state, and may reconcile the generated hashes against the hashes received from the smart contract on the liquidity provider's distributed ledger node.

In step 320, the smart contracts on the receiving financial institutions' distributed ledger nodes may compare the hashes, and when there is a mismatch, in step 325, the smart contracts on the receiving financial institutions' distributed ledger nodes may identify the entry causing the mismatch and may generate a notification.

In step 330, a resync of accounting entries from the liquidity provider's distributed ledger node to the receiving financial institutions' private state may be performed.

Figure 4:
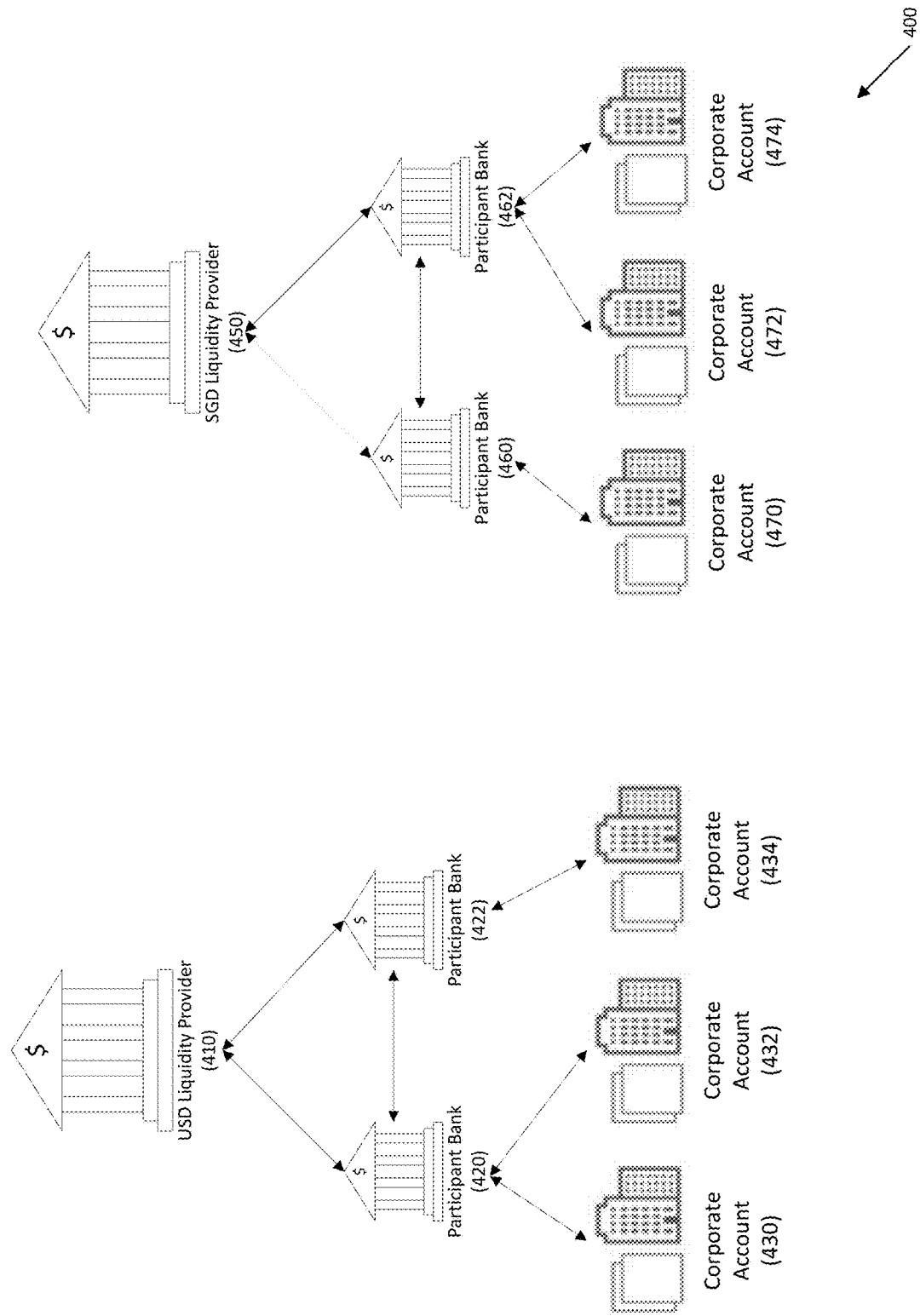
FIG. 4 depicts an illustrative example of shared ledgers with tiered liabilities and liquidity providers according to an embodiment.

Referring to FIG. 4, an illustrative example of shared ledgers with tiered liabilities and liquidity providers is provided according to an embodiment. For example, system 400 may include liquidity providers (e.g., Tier 1), such as USD liquidity provider 410 and SGD liquidity provider 450. Each liquidity provider has issuing bank liabilities.

Each participant bank 420, 422, 460, 462 may have a plurality of participant banks (e.g., Tier 2) that may interact with the liquidity provider. Participant banks 420, 422, 460, 462 may perform permissioned transfers based on AML/CFT controls.

Each participant bank 420, 422, 460, 462 may have its corporate clients (e.g., Tier 3) with corporate accounts 430, 432, 434, 470, 472, 474, and each corporate account 430, 432, 434, 470, 472, 474 may have account specific rules.

Embodiments may replicate the correspondent banking model with shared ledgers; may provide widened accesses to corporate clients with customizable rules, may provide a multi-currency network; and may extend to central bank digital currencies.

Thus, an issuing bank liability may be shared at a plurality of tiers.

Figure 5:
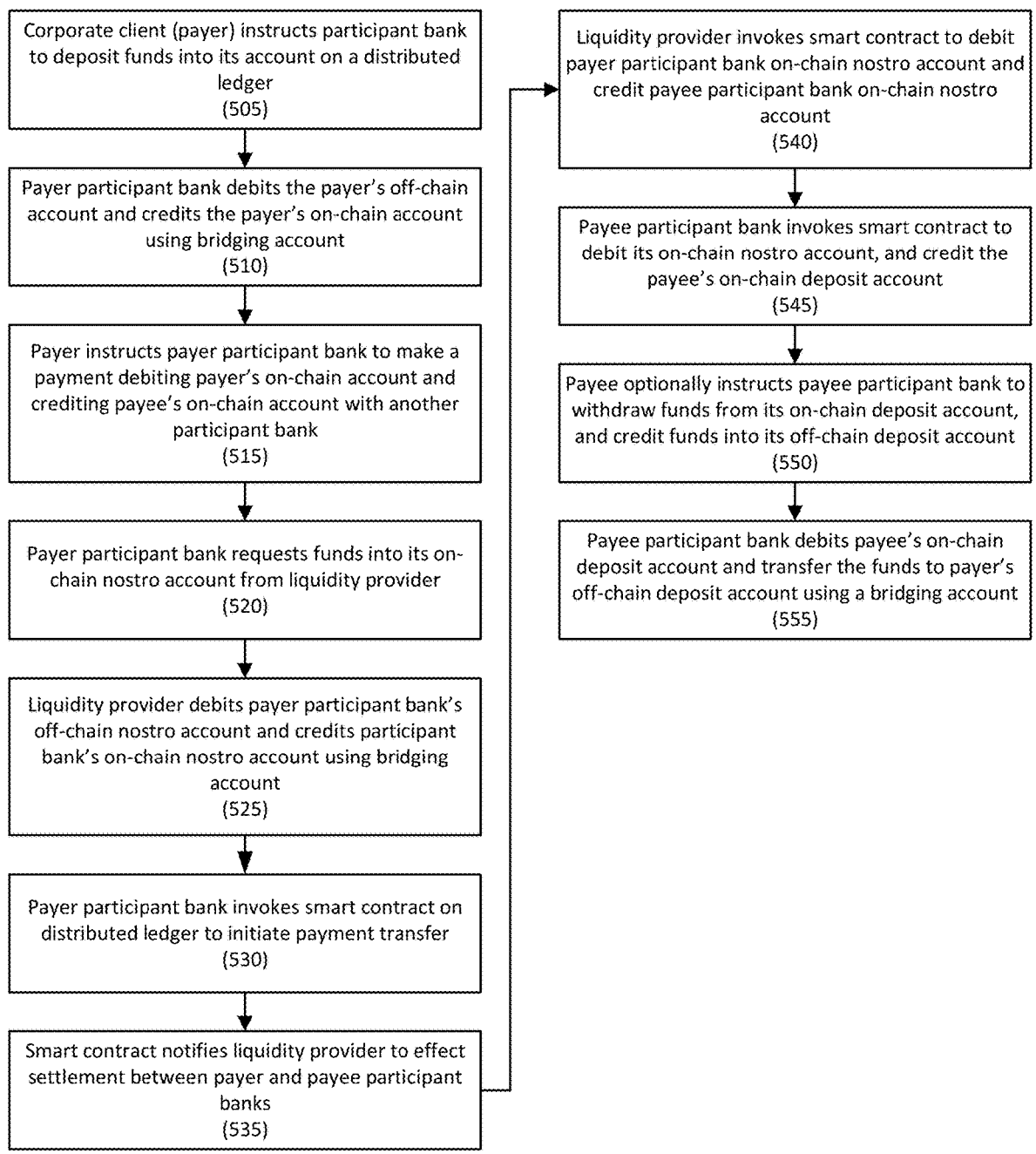
FIG. 5 depicts a method for distributed ledger based multi-tiered liability according to one embodiment.

Referring to FIG. 5, a method for distributed ledger based multi-tiered liability is disclosed according to an embodiment.

In step 505, a corporate client (e.g., a payer) may initiate instructions with its participant bank (e.g., the payer participant bank) to deposit into the payer's account on a distributed ledger in a distributed ledger network. This account may be referred to as an "on-chain" account. In one embodiment, this may not be necessary if the payer's on-chain account has sufficient funds.

In step 510, the payer participant bank may debit the payer's off-chain account, and credit the payer's on-chain account on the distributed ledger. As the off-chain account and the on-chain account sit on different platforms, the payer participant bank may use a bridging account to facilitate the funds movement. The bridging account may be used for financial reconciliation with the payee participant bank's general ledger.

For example, bridging accounts are generally used in pairs. Bridging happens when funds are moved from one sub-ledger (e.g., a financial institution's system) to another sub-ledger (e.g., distributed ledger). Thus, bridging accounts that mirrors each other are provided on each side. Both bridging accounts may be fed into the general ledger (GL) by the two different subledgers at the end of day, and the GL validates that the position of both bridging accounts are the same, otherwise it will cause a reconciliation break.

In step 515, the payer may instruct the payer participant bank to make a payment debiting the payer's on-chain account, and crediting a payee's on-chain account belonging to another participant bank. Both accounts are on the same blockchain network.

In step 520, the payer participant bank may request that the liquidity provider deposit funds into the payer participant bank's on-chain account for the purpose of interbank settlement.

In step 525, the liquidity provider may debit the payer participant bank's off-chain account, and credit the payer participant bank's on-chain account. In one embodiment, the liquidity provider may use an internal bridging account to traverse between sub-ledgers of the liquidity provider.

Steps 520 and 525 may not be needed if the participant bank's on-chain account has sufficient funds.

In step 530, the payer participant bank may invoke a first smart contract on the distributed ledger to initiate the payment transfer to the payee.

In step 535, the smart contract may notify the liquidity provider to effect the settlement between the payer participant bank and payee participant bank for the payment.

In step 540, the liquidity provider may invoke a second smart contract to debit the payer participant bank's on-chain account, and credit the payee participant bank's on-chain account, and inform both participant banks that settlement is completed.

In step 545, the payee participant bank may invoke a third smart contract to debit its on-chain account, and credit the payee's on-chain account.

In step 550, the payee may optionally instruct the payee participant bank to withdraw funds from the payee's on-chain account, and credit funds into the payee's off-chain account. In step 555, the payee participant bank may then debit the payee's on-chain account, and transfer the funds to payer's off-chain account using a second set of internal bridging accounts to cross the two subledgers.

In one embodiment, the smart contracts may provide at least some of the following technical features: (1) ensure debits and credits are posted atomically on the distributed ledger; (2) the ability for financial institutions to decline to process or settle the instruction (e.g., when a financial institution's internal systems identify a sanctions concern); (3) provide notifications to the parties to the transaction during the process; (4) extract transaction details from the smart contracts and provide into the financial institution's systems (e.g., AML, fraud, etc.); and (5) ensure that the debit is successful before the credit happens to avoid credit risk exposure. For example, if the debit account is off-chain, the financial institution's systems need to provide confirmation to the smart contract for the on-chain credit to happen. If on-chain credit is not successful (e.g., the account is frozen, the wrong account number, etc.), the smart contracts will respond back to the financial institution's system to perform a reversal of the debit. Similarly, if the credit account is off-chain, the smart contract will first debit the on-chain account and request the financial institution's system credit the off-chain account. If financial institution's system declines the credit, the smart contract will post a credit-back entry to the on-chain account.

FIGS. 6A and 6B, 7A and 7B, and 8 provide illustrative examples of use of a tiered liability model on a distributed ledger network. It should be noted that these are examples only and are non-limiting.

Figure 6A:
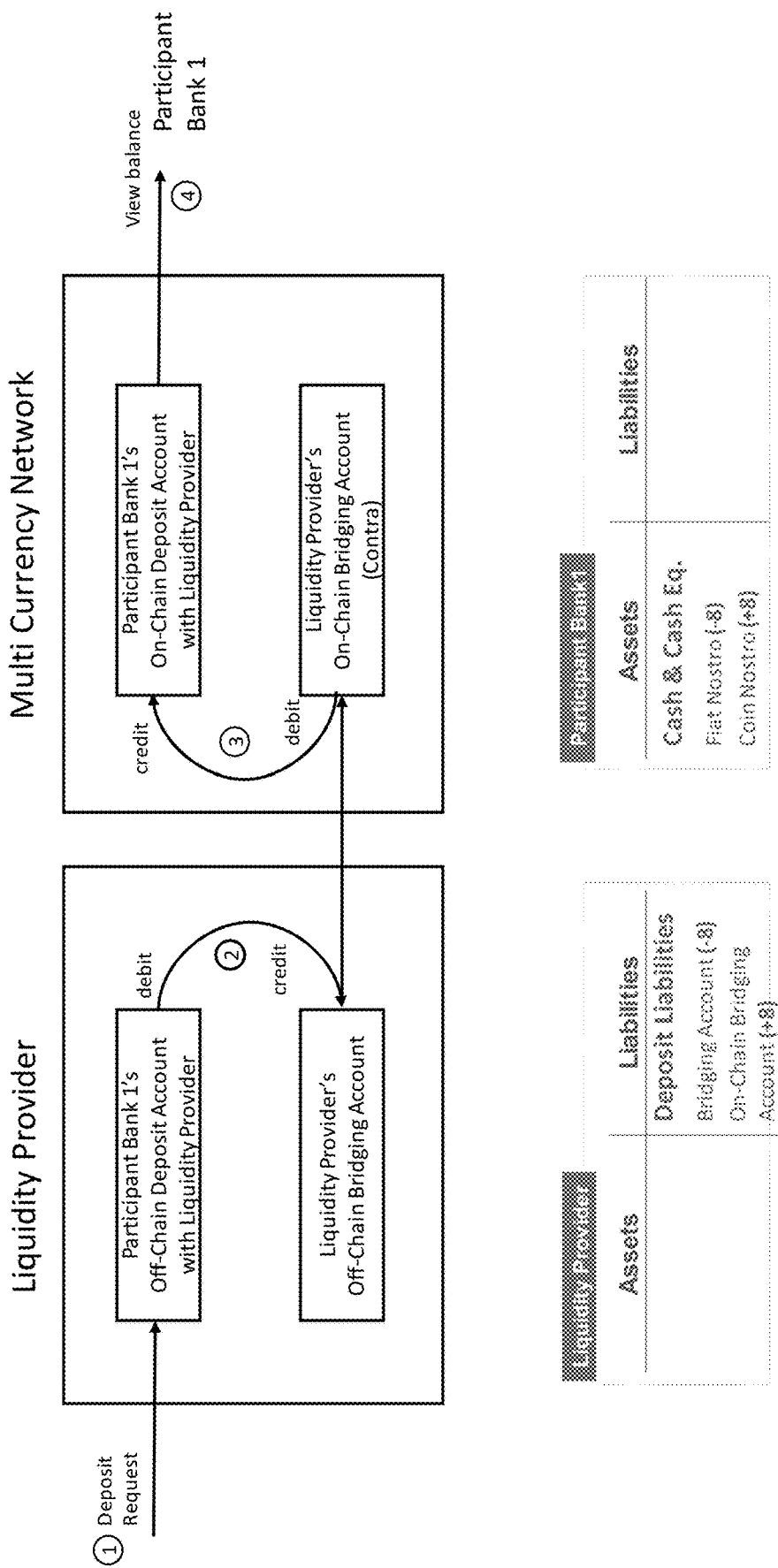
FIG. 6A depicts an exemplary flow for the direct deposit of funds into a deposit account on the distributed ledger via a liquidity provider bank according to an embodiment.
Figure 6B:
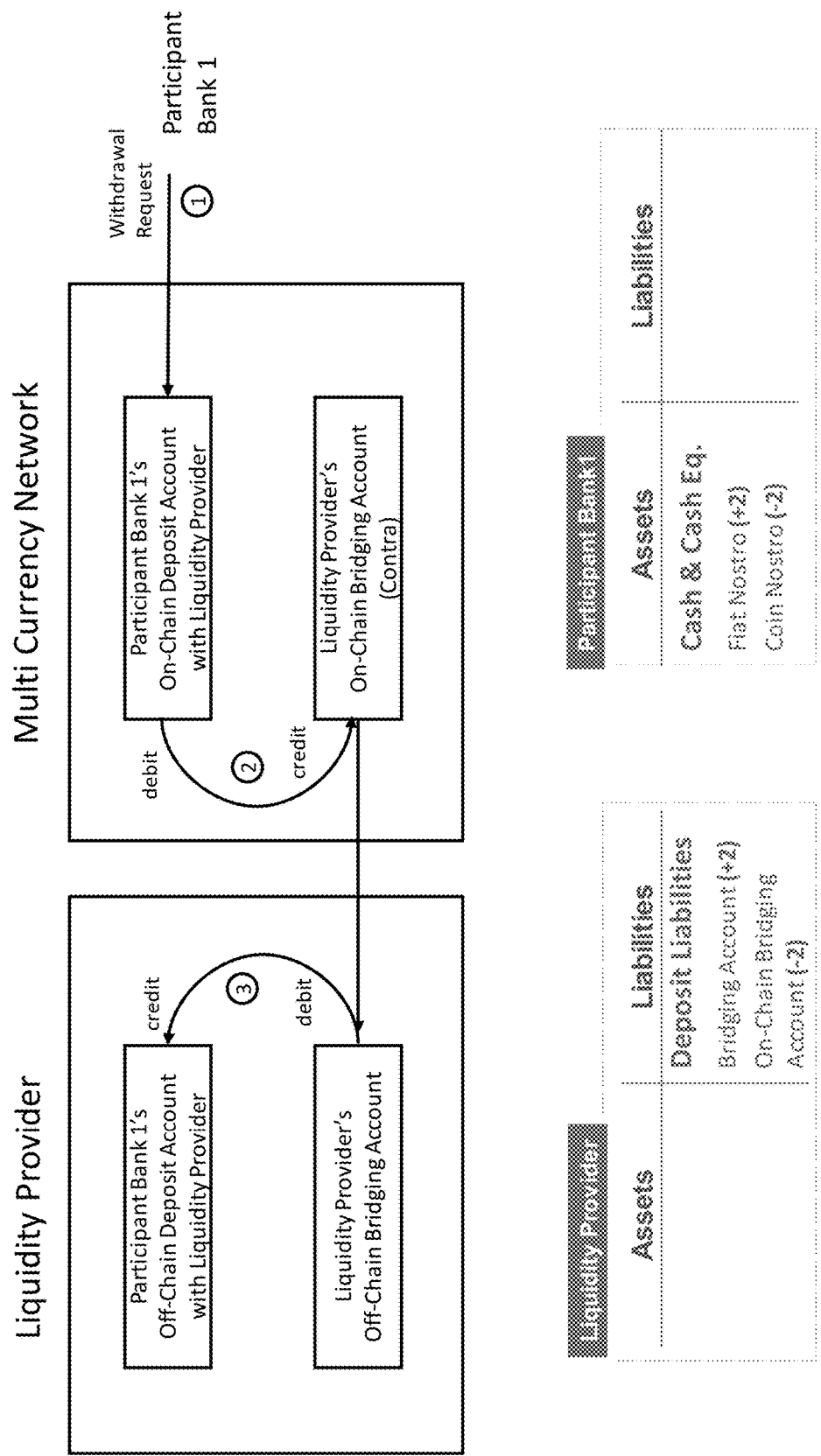
FIG. 6B depicts an exemplary flow for the direct withdrawal via a liquidity provider bank according to an embodiment.

Referring to FIGS. 6A and 6B, exemplary flows for the direct deposit of funds into a deposit account on the distributed ledger (FIG. 6A) and direct withdrawal (FIG. 6B) are disclosed. In FIG. 6A, the participant bank may provide a deposit instruction to a liquidity provider, which may debit the participant bank's off-chain account, and may credit the participant bank's on-chain account, using additional bridging accounts on both ledgers for contra entries. The participant bank may view its balance using a user interface.

The lower part of FIG. 6A depicts an exemplary model and accounting for the deposit process.

FIG. 6B depicts a direct withdrawal process according to an embodiment. The participant bank requests withdrawal using, for example, the participant bank's user interface and via the multicurrency network. The multi-currency network may debit the participant bank's on-chain deposit account balance, and then the liquidity provider may credit the participant bank's off-chain deposit account, using additional bridging accounts on both ledgers for contra entries.

The lower part of FIG. 6B depicts an exemplary accounting for the withdrawal process.

Figure 7A:
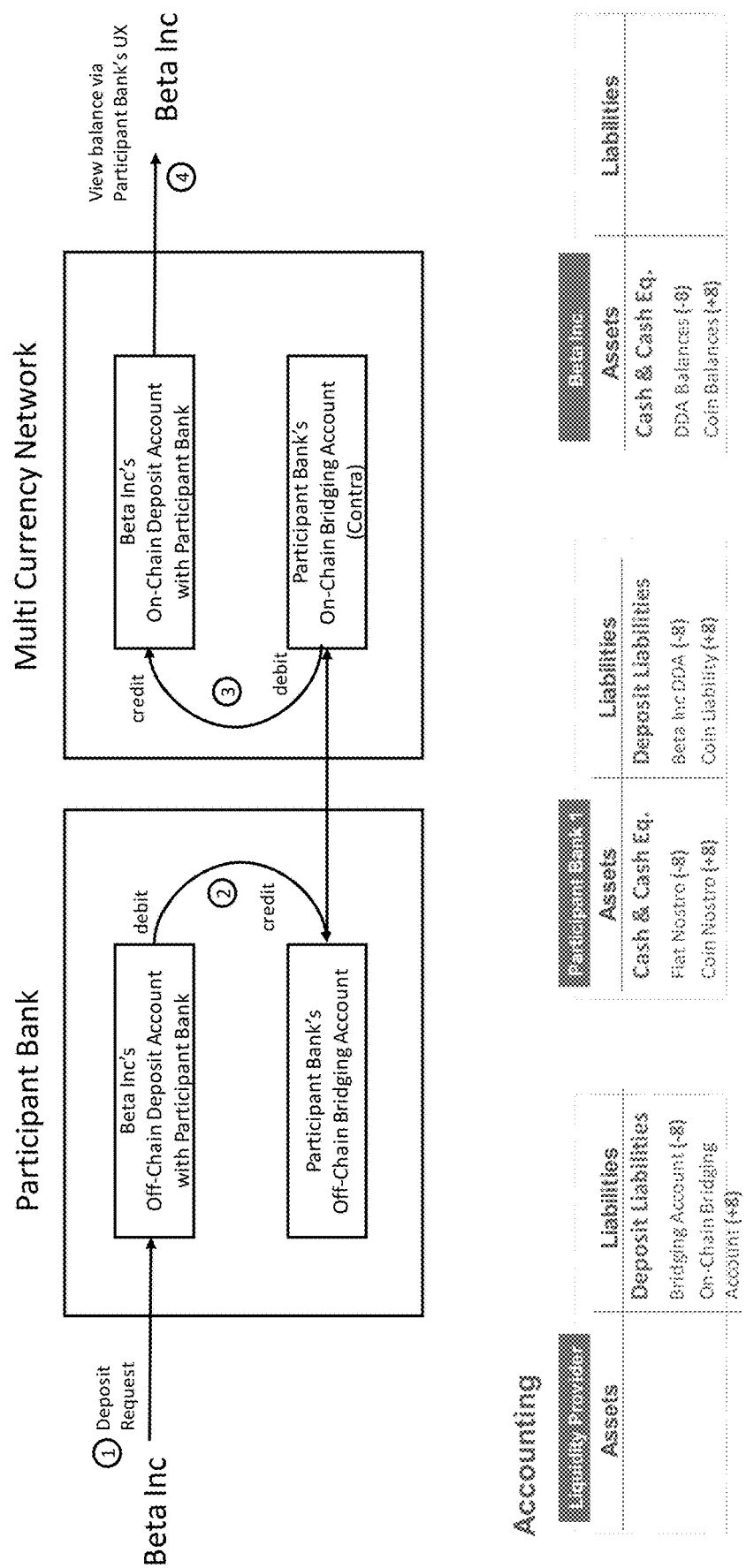
FIG. 7A depicts an exemplary flow for the deposit of funds into a deposit account on the distributed ledger via a participant bank according to an embodiment.
Figure 7B:
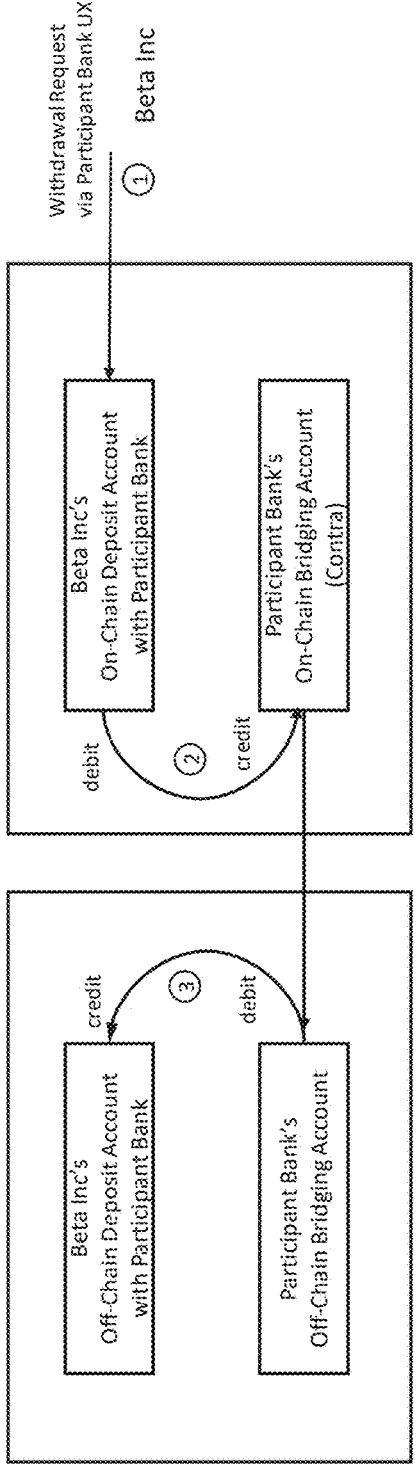
FIG. 7B depicts an exemplary flow for the direct withdrawal via a participant bank according to an embodiment.

Referring to FIGS. 7A and 7B, exemplary flows for the deposit of funds into a deposit account on the distributed ledger via a participant bank (FIG. 7A) and direct withdrawal via a participant bank (FIG. 7B) are disclosed according to embodiments.

In FIG. 7A, a corporate client (e.g., Beta Inc.) of a participant bank may provide a deposit instruction to the participant bank. The participant bank may debit the corporate client's off-chain account and credit its on-chain account. The participant bank may debit the corporate client's off-chain deposit account with the participating bank and may credit the participant bank's off-chain bridging account. The amount may then be written to the participant bank's on-chain bridging account on the multi-currency network, and then to Beta's on-chain account. The balance for the corporate client is the participant bank's liability, issued on back of the liquidity provider's liability held with the participant bank.

The corporate client may view the balance in the corporate client's on-chain deposit account using a user interface. In embodiments, the user interface for corporate client may be provided by the participant bank, and may query the participant bank's blockchain node.

The lower portion of FIG. 7A depicts an exemplary model and accounting for the deposit process.

FIG. 7B depicts a withdrawal process via a participant bank according to an embodiment. The corporate client (e.g., Beta Inc.) may request withdrawal from the multi-currency network, which may debit the corporate client's on-chain deposit account with the participating bank, and credit the participant bank's on-chain bridging account. The Liquidity provider may then debit the participant bank's off-chain bridging account, and credit the corporate client off-chain deposit account with the corporate client.

The lower portion of FIG. 7B depicts an exemplary accounting for the withdrawal process.

Figure 8:
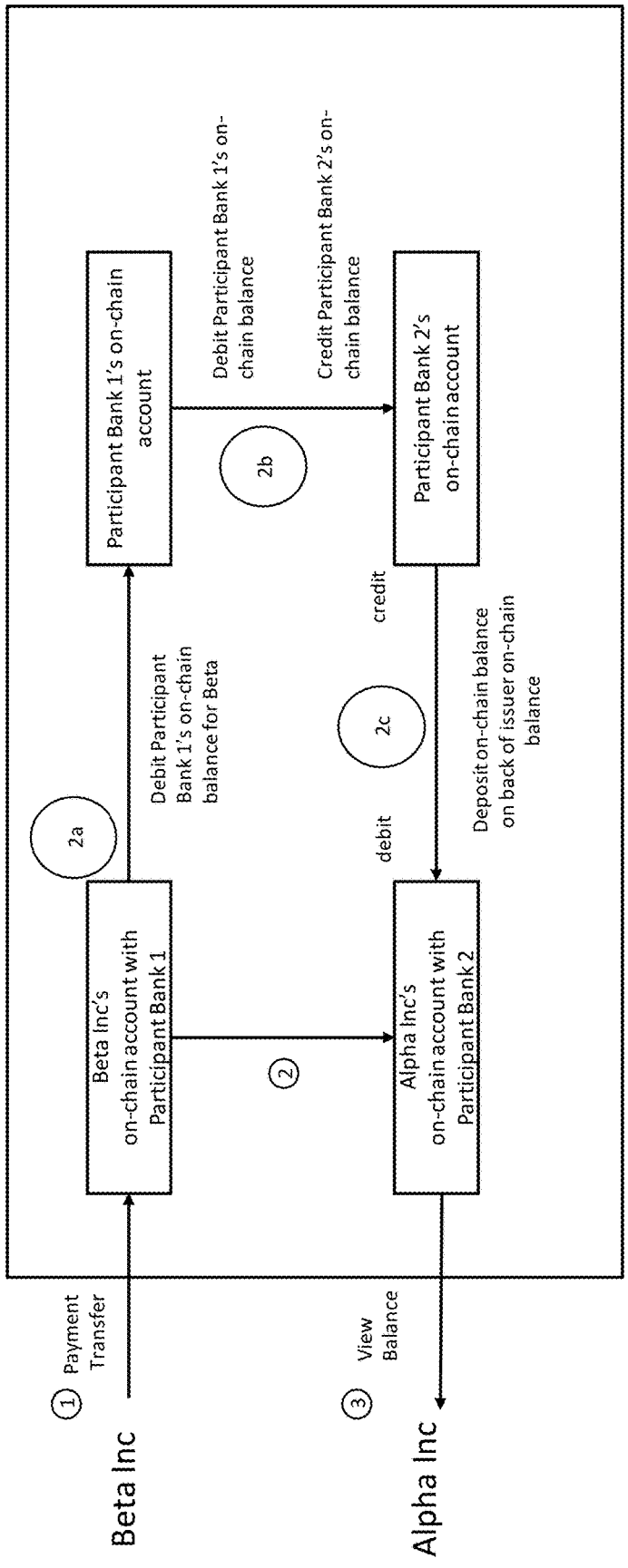
FIG. 8 depicts an exemplary flow for the transfer across participant banks according to an embodiment.
Figure 8:
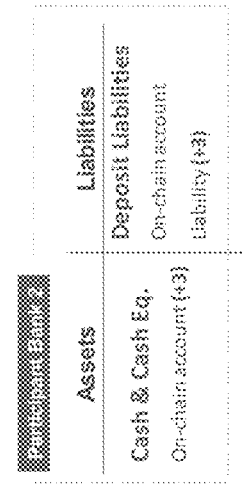
Figure 8:
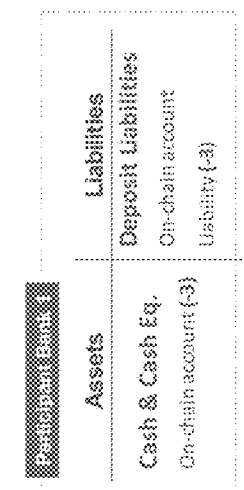
Figure 8:
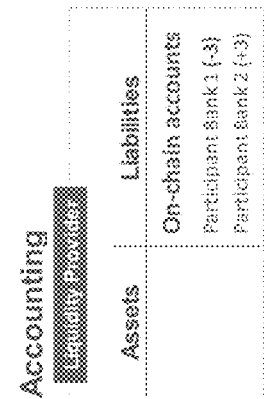

Referring to FIG. 8, an exemplary flow for the transfer across participant banks is provided according to an embodiment. In one embodiment, a first corporate client (e.g., Beta Inc.) may submit a payment transfer instruction to a multi-currency network. The participant bank for Beta Inc. (e.g., participant bank 1) may debit Beta Inc's on-chain account and credit participant bank 1's on-chain account. Participant bank 1's on-chain account may then be debited for the amount, and an on-chain account for a second participant bank (participant bank 2) may be credited. The second participant bank's on-chain account may then be debited and the second corporate client's (Alpha Inc.) on-chain account may be credited. Alpha Inc. may view the balance using a user interface.

In addition, Alpha Inc may view the balance using a user interface provided by participant bank 2, which may query participant bank 2's blockchain node.

The lower portion of FIG. 8 depicts an exemplary accounting for the transfer process.

Although several embodiments have been disclosed, it should be recognized that these embodiments are not exclusive to each other, and certain elements or features from one embodiment may be used with another.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen, for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

The invention claimed is:

1. A method for distributed ledger based multi-currency clearing and settlement, comprising:
    receiving, at a first distributed ledger node for a first financial institution in a distributed ledger network comprising a plurality of distributed ledger nodes, a transaction comprising a transfer request from a payor to transfer funds to a payee, the payee associated with a second financial institution, wherein the first distributed ledger node stores a public state and a private state for the first financial institution, wherein the private state for the first financial institution is private to the first financial institution;
    generating, by the first distributed ledger node, a symmetric key;
    encrypting, by the first distributed ledger node, a transaction payload for the transaction with the symmetric key;
    retrieving, by the first distributed ledger node, a public key for the second financial institution from a smart contract registry of registered participants on the distributed ledger network;
    generating, by the first distributed ledger node, a first financial institution/second financial institution shared key using a private key for the first financial institution and the public key for the second financial institution;
    encrypting, by the first distributed ledger node, the symmetric key with the first financial institution/second financial institution shared key;
    sending, by the first distributed ledger node, the encrypted transaction payload and the encrypted symmetric key to a second distributed ledger node for the second financial institution in the distributed ledger network, wherein the second distributed ledger node stores a public state and a private state for the second financial institution, wherein the private state for the second financial institution is private to the second financial institution;
    generating, by the second distributed ledger node, the first financial institution/second financial institution shared key using a public key for the first financial institution retrieved from the smart contract registry of registered participants on the distributed ledger network and a private key for the second financial institution;
    decrypting, by the second distributed ledger node, the symmetric key using the first financial institution/second financial institution shared key;
    decrypting, by the second distributed ledger node, the transaction payload using the symmetric key;
    writing, by the second distributed ledger node, the transaction payload to the private state for the second financial institution;
    retrieving, by the first distributed ledger node, a public key for a liquidity provider from the smart contract registry of registered participants on the distributed ledger network;
    generating, by the first distributed ledger node, a first financial institution/liquidity provider shared key using a private key for the first financial institution and the public key for the liquidity provider;
    encrypting, by the first distributed ledger node, the symmetric key with the first financial institution/liquidity provider shared key;
    sending, by the first distributed ledger node, the encrypted transaction payload and the encrypted symmetric key to a liquidity provider distributed ledger node for the liquidity provider in the distributed ledger network, wherein the liquidity provider distributed ledger node stores a public state and a private state for the liquidity provider, wherein the private state for the liquidity provider is private to the liquidity provider;
    generating, by the liquidity provider distributed ledger node, the first financial institution/liquidity provider shared key using a public key for the first financial institution and a private key for the liquidity provider;
    decrypting, by the liquidity provider distributed ledger node, the symmetric key using the first financial institution/liquidity provider shared key;
    decrypting, by the liquidity provider distributed ledger node, the transaction payload using the symmetric key;
    writing, by the liquidity provider distributed ledger node, the transaction payload to the private state for the liquidity provider;
    generating, by the first distributed ledger node, a hash of the encrypted transaction payload;
    submitting, by the first distributed ledger node, the hash of the encrypted transaction payload to the distributed ledger network;
    verifying, by a smart contract on the first distributed ledger node, that an account for the first financial institution has sufficient funds for the transaction;
    atomically transferring, by the smart contract, the funds from the account for the first financial institution on the distributed ledger network to an account for the second financial institution on the distributed ledger network;
    generating, by a smart contract executed on the liquidity provider distributed ledger node, a first hash of an accounting entry for the account for the first financial institution on the liquidity provider distributed ledger node;
    sending, by the smart contract, the first hash to the first distributed ledger node;
    generating, by the first distributed ledger node, a hash of an accounting entry in the private state for the account at the first distributed ledger node;
    comparing, by the first distributed ledger node, the first hash from the liquidity provider distributed ledger node to the hash generated by the first distributed ledger node;

generating, by the first distributed ledger node, a notification to the second distributed ledger node in response to the hash not matching; and resyncing, by the smart contract, one or more of a plurality of accounting entries at the liquidity provider distributed ledger node with the account entry at the first distributed ledger node.

2. The method of claim 1, further comprising:
recomputing, by the smart contract, balance ladders for the account for the first financial institution and the account for the second financial institution.

3. The method of claim 1, wherein the hash of the encrypted transaction payload is generated after the second distributed ledger node and the liquidity provider distributed ledger node have decrypted the transaction payload and written it to their respective private states.

4. The method of claim 1, further comprising:
verifying, by the smart contract, that the account for the first financial institution or the account for the second financial institution are not closed or frozen.

5. The method of claim 1, wherein a result of the verifying is replicated to smart contracts executed on the second distributed ledger node and the liquidity provider distributed ledger node.

6. The method of claim 1, wherein the transfer of funds from the account for the first financial institution to the account for the second financial institution is based on a separate agreement between the payor and the payee.

7. The method of claim 1, further comprising:
retrieving, by the smart contract, a foreign exchange rate agreement from a side chain; and
applying, by the smart contract, a foreign exchange rate from the foreign exchange rate agreement to the transfer of funds.

8. The method of claim 1, wherein the one or more of the plurality of accounting entries that are resynced are identified as having hashes from the liquidity provider distributed ledger node that do not match hashes generated by the first distributed ledger node.

9. The method of claim 1, wherein the smart contract executed on the liquidity provider distributed ledger node generates the first hash periodically.

10. The method of claim 1, wherein the smart contract executed on the liquidity provider distributed ledger node generates the first hash in response to a private state divergence at the first distributed ledger node.

* * * * *